(12) United States Patent
Hotz et al.

(10) Patent No.: US 8,948,034 B2
(45) Date of Patent: Feb. 3, 2015

(54) METHOD AND SYSTEM FOR THE DETECTION, TRANSMISSION AND ANALYSIS OF SAFETY-RELATED SIGNALS

(75) Inventors: Stephan Hotz, Pfungstadt (DE); Jörg Koch, Wettenberg (DE); Björn Schlotzhauer, Weimar (DE)

(73) Assignee: Elan Schaltelemente GmbH & Co. KG, Wettenberg (DE)

( * ) Notice: Subject to any disclaimer, the term of this patent is extended or adjusted under 35 U.S.C. 154(b) by 209 days.

(21) Appl. No.: 13/382,927

(22) PCT Filed: Jul. 2, 2010

(86) PCT No.: PCT/EP2010/059491
§ 371 (c)(1),
(2), (4) Date: Apr. 16, 2012

(87) PCT Pub. No.: WO2011/003835
PCT Pub. Date: Jan. 13, 2011

(65) Prior Publication Data
US 2012/0201161 A1    Aug. 9, 2012

(30) Foreign Application Priority Data
Jul. 7, 2009  (DE) .......................... 10 2009 026 124

(51) Int. Cl.
*H04L 12/26*    (2006.01)
*H04L 1/06*    (2006.01)
(Continued)

(52) U.S. Cl.
CPC ................ *H04L 1/22* (2013.01); *H01H 47/002* (2013.01); *H04L 1/06* (2013.01); *H04L 12/40169* (2013.01); *H04L 1/243* (2013.01); *H04L 12/40013* (2013.01)
USPC .......................................... 370/252; 370/328

(58) Field of Classification Search
USPC .................................................. 370/252, 328
See application file for complete search history.

(56) References Cited

U.S. PATENT DOCUMENTS 6,173,814 B1    1/2001    Herkel et al.
6,285,096 B1    9/2001    Muller et al.
(Continued)

FOREIGN PATENT DOCUMENTS

DE    33 03 791    8/1983
DE    37 18 582    12/1987
(Continued)

OTHER PUBLICATIONS

Anonymous: "Token ring", [Online], Jun. 4, 2009, Wikipedia, the free encyclopedia, pp. 1-4, XP-002604309.
(Continued)

*Primary Examiner* — Jason Mattis
(74) *Attorney, Agent, or Firm* — Ladas & Parry LLP (57) ABSTRACT

The invention relates to a method and a system for detecting, transmitting, and analyzing at least one safety-related signal (S1 . . . Sn), wherein the at least one safety-related signal (S1 . . . Sn) is detected using at least one detection unit (EE1 . . . EEn) and is transmitted to at least one analyzing unit (AE1 . . . AE4) via a radio system (FS). In order to simplify the detection of safety-related signals and improve the transmission thereof via a faulty radio path, at least two safety-related signals (S1, S2) are independently detected and transmitted to the analyzing unit (AE1 . . . AE4) via the radio system (FS) so as to allow a dangerous action to be carried out, and an output signal (FRS) for allowing a dangerous action to be carried out is generated by logically combining the received safety-related signals (S1 . . . Sn).

7 Claims, 6 Drawing Sheets

(51) Int. Cl.
*H04L 12/40* (2006.01)
*H04L 1/24* (2006.01)
*H04L 1/22* (2006.01)
*H01H 47/00* (2006.01)

(56) References Cited

U.S. PATENT DOCUMENTS

| | | | |
|---|---|---|---|
| 6,370,369 | B1 | 4/2002 | Kraiem et al. |
| 6,417,582 | B1 | 7/2002 | Dold et al. |
| 6,711,713 | B1 | 3/2004 | Rumpler et al. |
| 7,233,592 | B1* | 6/2007 | Oi et al. .................. 370/392 |
| 7,979,096 | B1* | 7/2011 | Elliott et al. ............. 455/572 |
| 2002/0193146 | A1 | 12/2002 | Wallace et al. |
| 2005/0232295 | A1 | 10/2005 | Young |
| 2006/0212144 | A1 | 9/2006 | Bechtel et al. |
| 2007/0105505 | A1 | 5/2007 | Crocker et al. |
| 2008/0089433 | A1 | 4/2008 | Cho et al. |
| 2008/0266081 | A1* | 10/2008 | D'Agostino et al. .... 340/539.21 |
| 2009/0125274 | A1* | 5/2009 | Waldock et al. ............ 702/181 |
| 2010/0102926 | A1* | 4/2010 | Grieve et al. ................ 340/5.1 |
| 2010/0152947 | A1* | 6/2010 | Denholm et al. ............. 701/29 |
| 2010/0246717 | A1 | 9/2010 | Aldana |
| 2012/0032854 | A1* | 2/2012 | Bull et al. ................... 342/450 |

FOREIGN PATENT DOCUMENTS

| | | |
|---|---|---|
| DE | 198 15 150 | 10/1998 |
| DE | 103 32 324 | 2/2005 |
| DE | 10 2007 041 621 | 3/2009 |
| JP | 2001-34302 | 2/2001 |

OTHER PUBLICATIONS

Anonymous: "Aktiver Personenschutz", [Online], Jul. 10, 2002, p. 68, XP-002622944.
Andreas Willig, et at, "Ring Stability of the PROFIBUS Token-Passing Protocol Over Error-Prone Links", IEEE Transactions on Industrial Electronics, vol. 48, No. 5, Oct. 1, 2001, pp. 1025-1033, XP-011023882.
Anonymous: "Galvanische Trennung", [Online], Wikipedia, the free encyclopedia, May 20, 2009, XP-002623122.
"Galvanische Entkopplung des Bus-I/O zum Feldbus-Funktionsmodul", [Online] Mar. 30, 2005, XP-002623123.
Anonymous: "Frequency-division multiplexing", [Online], Wikipedia, the free encyclopedia, May 19, 2009, XP-002623124.
S. Cavalieri, et at, "Fault tolerance in Interbus-S standard, Computer Standards & Interfaces", vol. 23, No. 3, Jul. 1, 2001, pp. 223-235, XP-004241215.
H. Schweinzer, et al., "Shared Data on InterBus", Internet Citation [Online], 1999, XP-002269738.
Mitsubishi Electric: "HMI Bediengerate/IPC/Visualisierungssoftware Technischer Katalog Vison 1000" [Online], Jul. 2007, pp. 1-48, XP-002625540.
Elan Schaltelemente GmbH: "Esalan Wireless, System and Product Overview WL/06" [Online], 2006, pp. 1-42, XP-002625541.
Motoman, "Motoman Yasnac XRC, Hochleistungssteuerung fur Industrieroboter" [Online], Aug. 2002, pp. 1-8, XP-002625542.
Mitsubishi, "GT115HS-QSBD, GT1150HS-QLBD, Handy GOT General Description" [Online], 2008, pp. 1-4, XP-002625543.
Kim Tae-Wan, et al. "Wireless Teaching Pendant for Mobile Welding Robot in Shipyard", in "Proceedings of the 17th World Congress the International Fereration of Automatic Control, Seoul, Korea, Jul. 6-11, 2008" pp. 4304-4309, XP-002625544.

* cited by examiner

METHOD AND SYSTEM FOR THE DETECTION, TRANSMISSION AND ANALYSIS OF SAFETY-RELATED SIGNALS

This application is a 371 of PCT/EP2010/059491, filed on Jul. 2, 2010, which claims priority to German Patent Application No. 10 2009 026 124.9, filed Jul. 7, 2009, both of which are incorporated herein by reference.

The invention relates to methods for the detection, transmission and processing of safety-related signals as well as to systems for carrying out the methods.

A method and a system of the initially cited type is described in DE-A-199 20 299. In the known method safety-related signals are detected with at least one detection means and transmitted via a radio transmission stretch to at least one signal processing means.

The safety-related signals are detected physically at least in two channels on a transmitting end and the detected data is transmitted logically in at least two channels in a reliable technology via radio to a receiving end. The received data is also processed and monitored physically in at least two channels on the receiving end.

Furthermore, the known method provides that for the at least two-channel processing as signal data, redundant signals are generated by at least double electromechanical, electrical or electronic input elements and that additional safety data that makes a monitoring possible is generated by each detection means from the signal data for transmission purposes.

The known circuit arrangement and/or the system comprises input means in the form of safety-related keys such as consent switches, NOT-HALT-, NOT-STOP command devices, process keys that are designed in two channels. For the two-channel analysis of the input means a first and a second detection unit are provided whose outputs are connected as the first channel and the second channel to a transmitter that transmits safety-related signals via a radio module to a receiver component in a processing unit. The received signal is processed and analyzed in a two-channel manner in this unit by a first and second processing means.

Starting from the above, the present invention has the basic problem of further developing a method and a system of the initially cited type in such a manner that the detection of safety-related signals is simplified and their transmission over a faulty radio stretch is improved.

Another problem consists in further developing a method and system in such a manner that situations can be controlled in which a dangerous movement of a machine is released by the consent of several observers and can be stopped in the case of danger by one or more observers. In the following the stopping of a dangerous movement is equated with the "elimination/resetting" of the release.

Also, a problem consists in making available a method and a system with which the extent and the availability of a radio stretch are improved.

The invention is furthermore based on the problem of further developing a method and a system in such a manner that the detection unit is constructed in a simple manner.

Finally, a problem of the invention consists in making a system available in which client-specific additions and changes can be carried out without recertification.

The problem of the invention is solved by, among other things, a method in which in order to release a dangerous action at least two safety-related signals are generated independently of one another and transmitted via the radio system to the analyzing unit, whereby an output signal is generated in the latter for the release of a dangerous action by logical linking of the received safety-related signals.

A preferred embodiment of the invention provides that the received safety-related signals are logically linked and/or emitted at least in two channels. The release signal is generated by a logical AND linkage of the received, safety-related signals.

It is provided that the transmission of the safety-related signals takes place by radio technology, whereby the transmission is carried out in frequency-, code- and/or in time multiplex technology. The transmission of the safety-related signals takes place here via a single radio system or via a single function stretch, whereby each detection unit is associated with a radio channel (FDM, Frequency Division Multiplexing), a time slot (TDM, Time Division Multiplexing) or a spread code (CDM, Code Division Multiplex).

Another preferred method provides that states such as conductive or non-conductive of contacts at least of one switching device such as consent switches or NOT-HALT-/NOT-STOP command devices that are connected to the detection unit or integrated in it are detected at least in two channels and preferably transmitted cyclically, preferably every 25 ms to the analyzing unit.

A time response of the signal transmission is preferably given by the analyzing unit, whereby the detection units are successively queried using an unambiguous identification by the analyzing unit and respond within a given time window in the range of preferably 2.5 ms.

The receiving and transmission of the safety-related signals preferably take place in accordance with the rest current principle.

Furthermore, the invention relates to a system for the detection, transmission and analysis of at least one safety-related signal, comprising at least one detection unit for the detection and transmitting of the at least one safety-related signal via a radio system to an analysis unit. Such a system is distinguished in that the system comprises at least two detection units with which a safety-related signal for the release of a dangerous action can be generated independently, that the safety-related signals can be transmitted by the radio system to the analysis unit and that the analysis unit comprises a logic unit with which a logical linkage of the received safety-related signals for the generation of an output signal for the release of a dangerous action can be carried out.

The logic unit comprises at least one AND linkage and is preferably realized in a processing unit such as a microcontroller preferably in a two-channel manner.

In order to make possible a mobile use of the detection units and therewith an activation at positions at which a dangerous movement of the system/machine to be monitored can be best seen, it is provided that the detection units are designed as mobile units, each comprising at least the connected or integrated switching device, a calculating unit such as a microcontroller as well as a transmitting/receiving unit such as a transceiver. It is preferable that the at least one switching device of the detection unit is designed as a consent switch or NOT-HALT-/NOT STOP command device. The analysis unit comprises the fact that the analysis unit comprises the preferably stationary processing unit with calculating unit and input/output unit as well as one or more distributed transmitting/receiving units such as transceivers.

The at least one switching device of the detection unit can be designed as a consent switch or a not-halt/not-stop command device.

The analysis unit can preferably be designed as a stationary processing unit (base station) with calculating unit such as a microcontroller and input/output unit as well as comprise one or more transceivers arranged in a spatially distributed manner or can comprise an integrated transceiver.

In order to optimize the effective range of the safety-related radio transmission stretch in a flexible manner, an independent concept of the invention provides that the safety-related signal emitted by the at least one detection unit is received by one or more transceiver units arranged in a spatially distributed manner, whereby the at least one transceiver unit is connected via a bus system to the processing unit (base station).

This makes it possible that one or more detection units preferably in the form of mobile stations can communicate via a radio stretch with an analysis unit.

The radio illumination of the radio system can be flexibly adapted in a very simple manner to the environment by the at least one transceiver unit spatially removed from the base station.

The transceiver units arranged in a spatially distributed manner prepare the received safety-related signals and transmit them in digital form via the bus system to the processing unit (base station).

In order to raise the transmission quality further, the transmitting/receiving quality of a transceiver unit is determined, with the consequence that only the transceiver unit with the highest transmitting/receiving quality is used for the communication between the processing unit (base station) and the detection unit.

Furthermore, it is provided that the base station transmits a message in the form of a frame (TOKEN) into the ring-shaped structure cyclically, preferably every 25 µs. The frame (TOKEN) then successively passes all transceiver units with a defined runtime, whereby each transceiver unit increments a counter implemented in the message in its header.

Furthermore, a preferred embodiment provides that the frame (TOKEN) of each transceiver unit that received a valid radio message is processed, whereby the received data is entered into the frame (TOKEN) and/or a quality index is replaced to the extent that the its own reception quality is greater than the entered one.

A transmitting of the message by a transceiver unit preferably takes place in such a manner that the base station enters a receiver identification of the transceiver unit with the highest reception quality of the last frame (TOKEN) in a transmitter identification field of the frame (TOKEN) and that the transceiver unit whose identification is entered in the transmitter identification field transmits the input message.

The transceiver units can be operated on different radio channels, in particular for the redundant transmission on two radio channels, for the operation of several mobile stations on an analysis unit, for the wireless connection of additional actors/sensors to the analysis unit and/or for the bidirectional safety-related transmission between two analysis units.

A system for the detection, transmission and analysis of at least one safety-related signal that is detected by at least one detection unit and transmitted via a radio stretch to at least one analysis unit is distinguished in that the analysis unit comprises a processing unit (base station) with at least one transceiver unit arranged in a spatially distributed manner for receiving the safety-related signal transmitted from the at least one detection unit, whereby the at least one transceiver unit is connected via a bus system and to the processing unit.

For an optimal radio illumination the system can comprise a plurality of spatially distributed transceivers. The spatially distributed transceiver units have at least one antenna as well as at least one bus connection, preferably high-speed bus connections.

For the preparation of the received signal the transceiver units can comprise a signal preparation unit for the transmission of the signal over rather long distances.

The bus system can be designed as a ring-shaped bus structure with optical and/or electrical signal transmission.

Furthermore, a preferred embodiment provides that the transceiver units are arranged cascaded in the ring bus-shaped bus system. The transceiver units are connected for the voltage supply to the base station or have decentralized voltage supplies, preferably galvanically decoupled.

Furthermore, according to an independent concept of the invention the invention relates to a method for the detection, transmission and analysis of safety-related signals, whereby the safety-related signals represent a state such as conductive or non-conductive of at least two switching contacts of a switching device, detected in two channels and transmitted via a radio system to an analysis unit, and whereby the received, safety-related signals are analyzed and, if necessary, an output signal is generated for the release or for turning off a dangerous action. The method is distinguished in that each switching contact of the switching device is loaded with a test sequence, and that the test sequence on the switching contact is directly transmitted via the radio system to the analysis unit.

The test sequence is preferably dynamically given by the analysis unit or is generated in the detection unit on the basis of a sequence number transmitted by the analysis unit. In order to reduce the data volume to be transmitted, it is provided that the analysis unit transmits the sequence number to the detection unit and that unambiguous test sequences such as binary test patterns for each connected switching contact are generated in the detection unit from the received sequence number. The binary test patterns are produced at least in two channels by scrambling, code spreading or by lookup tables in hardware and/or software.

The sequence numbers can be generated by a random number generator as pseudo-random numbers that are transmitted by a input message to the detection units, whereby two binary test patterns for the test of the switching contacts of the two-channel switching device are generated from the received pseudo-random numbers by two different scramblers.

The binary test patterns on an output of the switching contacts of the switching elements are preferably transmitted back by a input message to the analysis unit and analyzed in it in two channels.

A two-channel analysis of the input message preferably takes place in the analysis unit by two microcontrollers, whereby each microcontroller processes the complete safety-related signal.

In the analysis of the received signals the binary test patterns are descrambled, whereby a check is made after a descrambling whether the result coincides, given closed contacts, with the original transmitted pseudo-random number.

If one of the two results does not coincide with the transmitted pseudo-random number or with the test pattern, i.e., even given an open switching contact of the switching element, this signal is cut out for safety-related reasons.

According to another preferred procedure the detection and the transmission of the contact states of the switching element take place via the radio stretch in accordance with the rest current principle.

A separate binary test pattern is preferably used for each channel of the switching element.

The at least two-channel signal determined from the test of the at least two-channel switching element represents a single safety-related piece of information that is transmitted in one channel to the analysis unit. This information is preferably formed from a sum of the test patterns of each channel.

In order to produce a data sequence to be transmitted, selected test patterns are used in such a manner that the data sequence results in a coded signal with a minimal Hamming distance of, e.g., 6 or 12 that allows the safety-related signal to be transmitted via radio without further data backups.

The invention furthermore relates to a system for the detection, transmission and analysis of safety-related signals, comprising a detection unit with at least one connected or integrated two-channel switching device for switching contacts, whereby the safety-related signals represent a state such as conductive or non-conductive of one of the switching contacts, and comprises a radio system for the transmission of the safety-related signals to an evaluation unit in which the received safety-related signals are analyzed preferably in two channels and an output signal is optionally generated for the release or turning off of a dangerous action. The system is distinguished in that the analysis unit and/or the receiving unit comprise means for generating a test sequence for each of the switching contacts, that the switching contacts are each connected on the input side to a connection on which there is a test sequence and are connected on the output side to inputs of a calculating unit for detecting and transmitting the test sequences to the analysis unit.

In order to set a sequence number the analysis unit has a pseudo-random number generator, whereby the sequence number can be transmitted via the radio system to the detection unit, and whereby the test sequence can be generated in the means for generating a test sequence from the sequence number.

The means for generating a test pattern are preferably designed as hardware and/or software scramblers or as a lookup table in the hardware and/or software. The hardware and/or software scramblers can be designed with two channels.

The detection unit comprises a microcontroller whose output is connected to the input of the two-channel scrambler. Outputs of the scramblers are connected to contacts of the switching element and outputs of the switching contacts are connected to inputs of the microcontroller.

Another preferred embodiment of the system provides that the detection unit comprises a microcontroller as well as a hardware logic, whereby a first lookup table is implemented in the microcontroller and a second lookup table is implemented in the hardware logic, whereby an input of each of the lookup tables is connected to an output of the transceiver in order to supply the sequence number, and whereby an output of each of the lookup tables is connected to a switching contact of the two-channel switching device as not-stop, whereby a switching contact is connected on the input side to the lookup table of the microcontroller and on the output side to a logic block of the hardware logic, and the switching contact connected to the lookup table is connected on the output side to a logic block integrated in the microcontroller, whereby outputs of the logic block are connected to a summator for the generation of a single signal (of information) that can be transmitted in one channel to the analysis unit.

Multi-channel signals can be detected by this embodiment, whereby the individual channels i.e., switching contacts are detected independently of each other with suitable binary test patterns and the results are combined in a very simple manner, for example, by simply arranging them in succession in the summator in such a manner that a signal results that has a minimal Hamming distance suitable for the reliable transmission over a radio stretch.

The switching device is preferably designed with two channels and comprises two switching contacts.

Even the processing unit in the evaluation unit is designed with two channels, whereby each channel has a descrambler unit, preferably for each contact of the two-channel switching device.

According to another independent concept of the invention the invention relates to a method for the detection, transmission and analysis of safety-related signals, whereby the safety-related signals represent a state such as conductive or non-conductive of at least one switching contact of a switching device and have two channels, and are transmitted via a radio system to an analysis unit, and whereby the received safety-related signals are analyzed and an output signal is generated, if necessary, for the release or turning off of a dangerous action. Such a microcontroller is distinguished in that the detection and/or processing of the at least two-channel signal takes place in software and hardware, whereby a first channel is designed according to software and a second channel is designed according to hardware.

The hardware channel is preferably constructed in fixed-programmed technology such as FPGA- or PLD technology whereas the software channel is realized as a software program in a microcontroller.

In order to discover errors in the hardware and/or software in the detection unit it can be checked at set time intervals by the analysis unit.

It is furthermore provided that in order to check the hardware and/or software special sequence numbers are transmitted from the analysis unit to the detection unit and that open switching contacts are simulated with them in the detection unit. The analysis unit has an expectancy behavior here relative to the reception of test sequences so that software errors and/or hardware errors can be recognized in the detection unit.

According to another an independent concept of the invention the invention relates to a system for the detection, transmission and analysis of safety-related signals with at least one safety-certified detection unit, at least one radio stretch and at least one safety-certified processing unit, whereby the safety-certified detection unit has at least one safety-related input, operating inputs/outputs as well as a transmission/reception unit for wireless communication via the radio stretch, and whereby the safety-certified processing unit comprises safety-related inputs/outputs and operating inputs/outputs. Such a system is distinguished in that the safety-certified detection unit as well as the safety-certified processing unit each comprise a universal data interface.

As a result, a fixed or even a variable bandwidth (tunnel) is made available for the transparent transmission of other, non-safety-relevant data. The universal data interface serves for the using of the transparent transmission channels by other applications.

An input of the universal data interface is connected to an output of a client-specific module that makes a client-specific interface available on the input side.

In a preferred embodiment of the system an analog output and/or input such as an analog voltage output/voltage input and/or a serial input/output such as RS232 is made available via the universal data interface.

The universal data interface can preferably be adapted to a client-specific application in hardware and/or software. The universal data interface is preferably connected via a data protection module for control data to a multiplexer/demultiplexer whose output is connected to a transceiver.

A method is distinguished in that the safety-certified system makes available a fixed and/or a variable bandwidth for the transparent transmission of non-safety-relevant data. The data is preferably inserted into and/or taken away from hardware by superposed multiplexing or inserted into and/or taken away from software by packing into and/or packing out of a transmission protocol.

Further details, advantages and features of the invention result not only from the claims, the features to be gathered from them—by themselves and/or in combination—but rather also from the following description of preferred embodiments to be gathered from the drawings, Which show:

Figure 1:
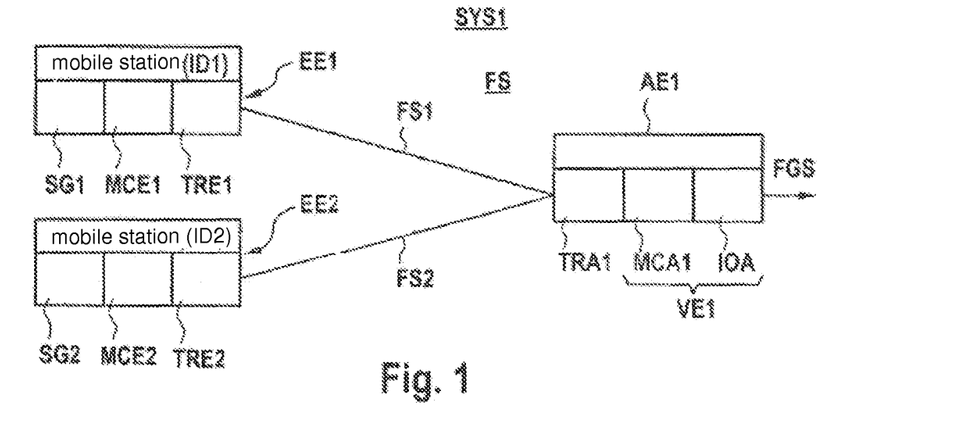
FIG. 1 shows a schematic view of two detection units constructed as mobile stations that communicate via radio with an analysis unit constructed as base station with removed transceivers.

FIG. 1 shows a schematic view of a first embodiment of a system SYS1 for the detection, transmission and processing of safety-related signals S1 . . . Sn. The system SYS1 comprises at least two, preferably mobile detection units EE1, EE2 coupled via a radio stretch FS1, FS2 to a preferably stationary analysis unit AE1. The radio stretches FS1, FS2 are part of a radio system FS.

The detection units EE1, EE2 each comprise at least one switching device SG1, SG2 such as a consent switch, NOT-STOP and/or NOT-HALT command device, a microcontroller MCE1, MCE2 as well as a transmission/receiving unit TRE1, TRE2 such as a transceiver. The analysis unit AE comprises at least one transmission/receiving unit TRA1 such as a transceiver, a processing unit VE1 with microcontroller MCA and input/output ports IOA.

The safety-related system SYS1 shown in FIG. 1 permits the radio transmission of safety-related signals from several detection units EE1, EE2 and their logical linkage in the analysis unit AE1. Safety-related signals in at least two channels are detected via the detection units EE1, EE2 and transmitted via a radio stretch FS1, FS2, whereby each radio stretch corresponds to a radio channel, to the processing unit VE1, constructed with at least two channels, of the analysis unit AE. Instead of a radio system with two radio channels (FDM, Frequency Division Multiplexing), TDM (Time Division Multiplexing) or CDM (Code Division Multiplexing) can be used.

The safety-directed signals received by radio are logically linked in at least two channels by the processing unit VE1 integrated in the analysis unit AE1 by the microcontroller MCA. Then, based on the result of the logical linking an output signal FGS is set in order to release a dangerous action or the release signal is taken back in order to stop the action.

In the so-called rest current principle several safety-related signals, for example, states of the contacts of the switching devices SG1, SG2 that are designed, for example, as consent switches or as a NOT-HALT-/NOT-STOP command device, are detected in at least two channels by the detection units EE1, EE2 and transmitted cyclically, for example, every 25 ms in the multiplex method via the radio stretches FS1, FS2 to the analysis unit AE1.

The time response in the communication with the detection units EE1, EE2 is given by the analysis unit AE1. The detection units EE1, EE2 are queried successively using an unambiguous identification ID1, ID2 by the analysis unit AE1 (polling). The particular addressed detection unit EE1, EE2 responds to the query within a given time window of, for example, 2.5 ms+/−0.5 ms.

The analysis unit AE1 checks the received safety-related signals and data and carries out a logical linking of the signals and/or outputs them via the input/output unit IO. The logical linking takes place in a safety-related manner, that is, the output signal (FGS) is cut out in a safety-related manner if, for example a consent of a consent switch is lacking or a NOT-HALT-/NOT-STOP command device was actuated or if no response from one or more detection units EE1, EE2 is received within a certain time frame.

In safety-critical system areas/machine areas, for example, consent switches are used as detection units whose activation is necessary for the introduction of a dangerous movement.

When using the wireless consent switch EE1, EE2 the activation can take place at the position at which the dangerous movement of the system or machine can best be viewed.

If the area in which the dangerous movement is to take place can not be completely seen by a person, several observers are required if necessary.

The above-described invention creates the possibility that the dangerous movement is released only after the consent of all observers, for example, by logical AND linking.

It is now possible for the first time in accordance with the invention to transmit several safety-related signals over the single radio system FS and logically linking the safety-related signals in a suitable manner.

Figure 2:
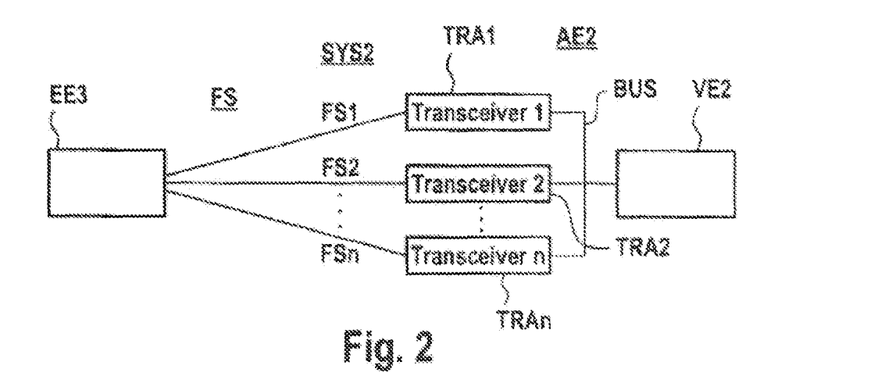
FIG. 2 shows a schematic view of a mobile station coupled via radio to several transceiver units connected via a bus system to a base station.

FIG. 2 shows in a purely schematic fashion a radio system SYS2 for the transmission of safety-related signals from a detection unit EE3 to an analysis unit AE2, whereby for a flexible optimization of the effective range of the safety-related radio system SYS2 transceiver units TRA1 . . . TRAN are connected via a bus system BUS to the processing unit VE2 (base station) and for their part are coupled via radio stretches FS1, FS2 . . . FSn to the at least one receiving unit EE3.

In the radio system SYS2 shown in FIG. 2 one a more detection units EE3 that are constructed as mobile stations communicate via radio stretches FS1, FS2 . . . FSn with the analysis unit AE2 comprising the permanently installed processing unit VE2 (base station) as well as locally removed transceiver units TRA1 . . . TRAn.

The radio illumination of the radio system SYS2 is flexibly adapted to the environment by the transceiver units TRA1, TRA2 . . . TRAn spatially removed from the processing unit VE2 (base station).

Figure 3:
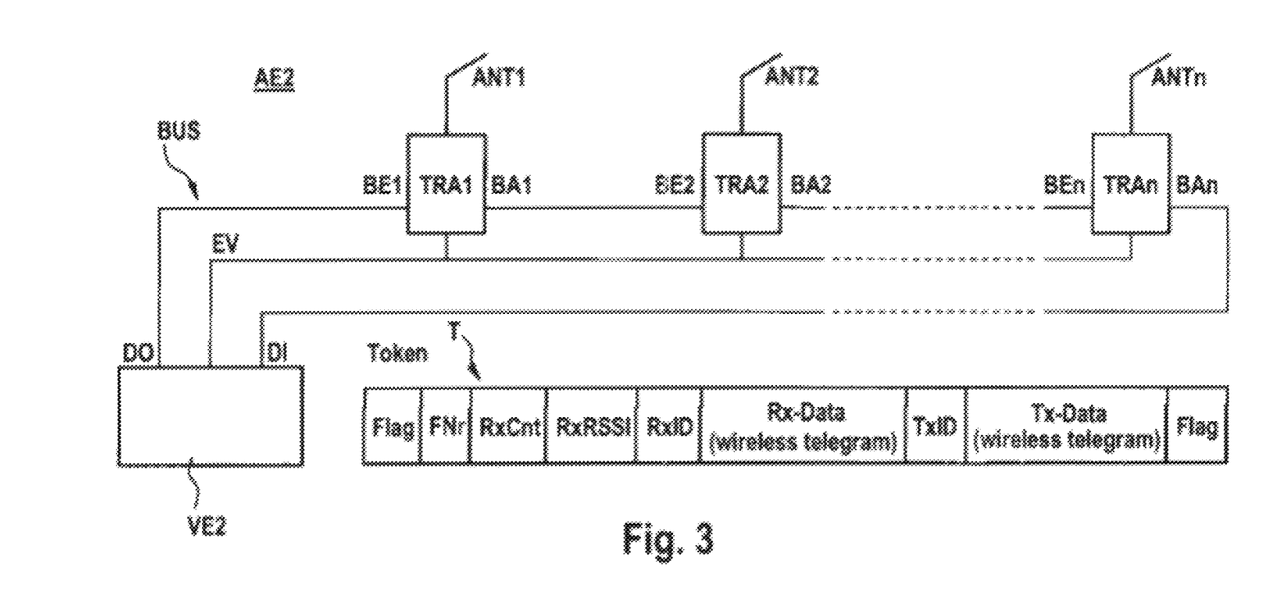
FIG. 3 shows the transceivers according to FIG. 2 arranged in a ring structure and connected to the base station.

FIG. 3 shows the connecting of the transceiver units TRA1 . . . TRAn via the bus BUS designed as a ring bus to the processing unit VE2 (base station) of the analysis unit AE2. Each of the transceivers TRA1 . . . TRAn comprises an antenna ANT1, ANT2 . . . ANTn as well as a bus input BE . . . BEn and a bus output BA1 . . . BAn. Likewise, the processing unit (base station) VE2 has a data output DO and a data input DI that are connected to ends of the ring bus BUS. In order to supply the transceiver units with energy they are connected via an energy supply line EN to the processing unit (base station) VE2 or to a decentralized supply.

The spatially remote transceivers TRA1 . . . TRAn offer the possibility of preparing the received radio signals so that they can be forwarded over greater distances to the processing unit (base station) VE2. Any number of transceivers TRA1 . . . TRAn can be connected in a cascaded manner into the ring-shaped bus BUS. The bus BUS itself can be constructed as an optical or an electrical bus.

It is provided that the processing unit (base station) is relieved in that it only communicates with the transceiver TRA1 . . . TRAn with the highest transmission/receiving quality.

At first, the reception of a reception message RxT by the analysis unit AE2 will be described. It is provided to this end that the processing unit (base station) VE2 cyclically transmits a frame (TOKEN) T shown in FIG. 3 into the ring bus BUS, e.g., every 25 ms. The token T successively passes all transceiver units TRA1 . . . TRAn with a defined transit time. The token T shown in FIG. 3 is preferably constructed in such a manner that it comprises a flag FLAG, a flag number FNR, a reception counter RxCNT, a reception quality index RxRSSI, a reception identification character RxID, reception data Rx-DATA, a transmission identification character TxID, transmission data Tx-DATA and an end flag FLAG.

If the token T successively passes the transceivers TRA1 . . . TRAn, each transceiver unit increments the reception counter RxCNT in the header.

Finally, the token T is processed by each transceiver unit TRA1 . . . TRAn that received a valid radio message. The first transceiver unit that received a valid radio message carries the received data RxDATA into the token T. Furthermore, the reception quality index RxSSI and the reception identification carrier RxID are replaced to the extent that the intrinsic reception quality is greater than the entered one. Consequently, the token T obtains the received data of the transceiver unit that has the highest reception quality index RxRSSI after having passed the transceivers TRA1 . . . TRAn.

The transmitting of a message takes place by a single transceiver TRAx in that the processing unit (base station) VE2 enters the module identification character RxID of the transceiver with the highest reception quality of the last received token T in the field of the transmission identification character TxID. The transceiver TRAx, whose identification ID is entered in the module identification ID TxID then transmits the message Tx-DATA.

The ring structure of the bus BUS can be expanded almost as desired for an optimal radio illumination. Also, a decentralized voltage supply for the transceivers TRA1 . . . TRAn can be realized with a complete galvanic decoupling. The transceivers TRA1 . . . TRAn can be operated on different radio channels, e.g., for: a) redundant transmission on two radio channels, b) several detection units EE1 . . . EEn on an analysis unit AE, c) additional actors/sensors on an analysis unit AE, and device bidirectional safety-related transmission between two analysis units AE1, AE2.

The radio illumination can be adapted to the local conditions by using several transceivers TRA1 . . . TRAn. In order to avoid attenuation losses in the forwarding of high-frequency radio signals from the processing unit (base station) VE2 to the transceivers TRA1 . . . TRAn and vice versa as they occur, e.g., given a diversity of pure antennas, in the described method the radio signals are prepared by the transceivers and exchanged in digital form via the bus system BUS. The system is in particular suited for use in an environment heavily loaded with EMV on account of the great flexibility.

Figure 4:
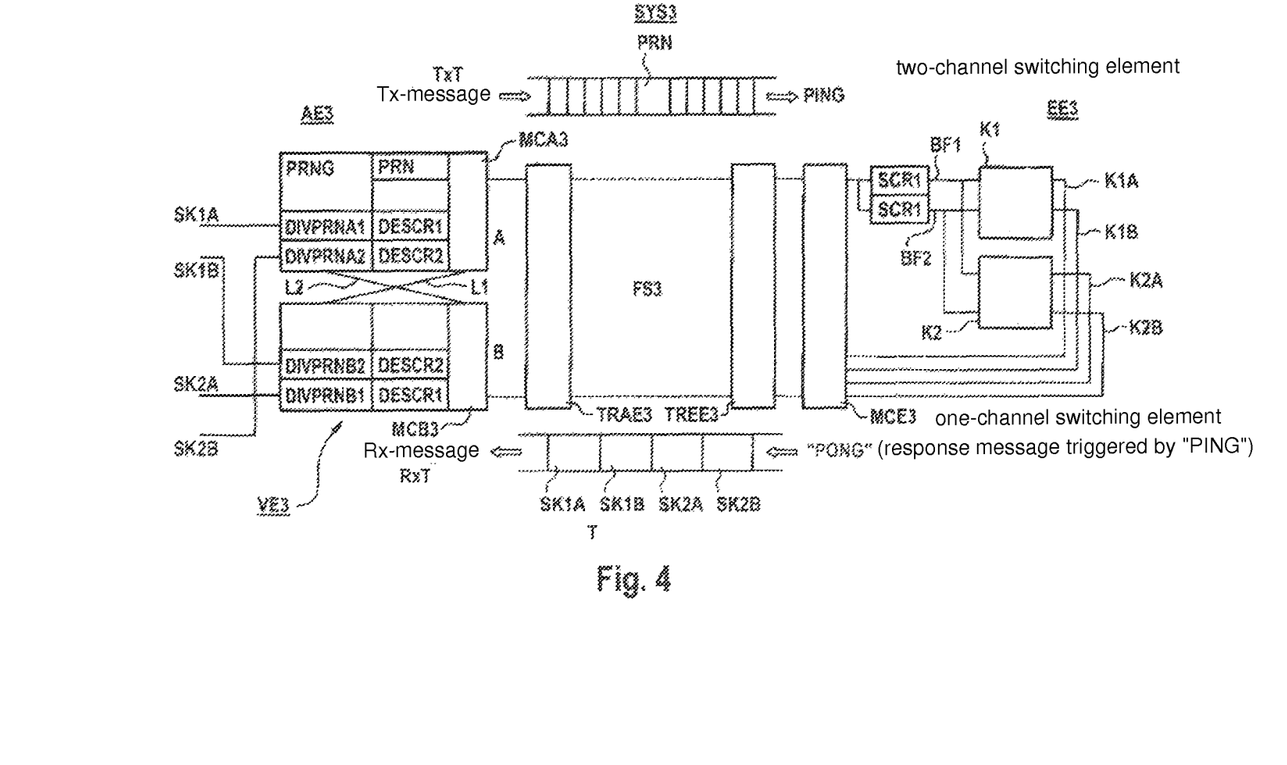
FIG. 4 shows a block schematic of the radio system with receiving unit and analysis unit.

FIG. 4 shows the principle construction of a radio system SYS3 for the transmission of safety-related signals from a detection unit EE3 via a radio stretch FS3 to an analysis unit AE3.

According to an independent concept of the invention the method described in the following for the detection and transmission of safety-related signals via the radio stretch FS3 is distinguished in that the detection unit EE3 (mobile station) detects the safety-related signals at least in two channels and transmits them to the secure processing unit (base station) VE3 with at least two channels in the analysis unit AE3. In the present embodiment the processing unit (base station) VE3 is designed with two channels and comprises a first channel A with a microcomputer MCA3 and second channel B with a microcomputer MCB3. The microcomputer MCA3 comprises a random number generator PRNG for the generation of pseudo-random numbers PR N. Furthermore, the microcontrollers MCA3 and MCB3 each comprise units DIVPRNA1, DIVPRNA2 as well as DIVPRNB1, DIVPRNB2 for monitoring the received pseudo-random numbers PR N and releasing corresponding signals SK1A, SK1B, SK2A and SK2B of associated contacts K1A, K1B; K2A, K2B that are connected to the detection unit EE3 and are monitored by it.

The microcontrollers MCA3 and MCB3 are connected to each other via lines L1, L2 for crosswise data comparison.

Furthermore, at least one of the two microcontrollers MCA3, MCB3 is coupled to a transmission/receiving unit such as transceiver TRAE3.

The detection unit EE3 also comprises a microcontroller MCE3 for the control of the detection of, for example, two two-channel switching elements K1, K2. Each switching element K1, K2 comprises two switching contacts K1A, K1B and K2A and K2B whose context states are read in. An output of the microcontroller MCE3 on which the received pseudo-random number PRN is, is connected to an input of a scrambler SCR1, SCR2. An output of the scrambler SCR1 is connected to an input of the first contact K1A of the switching element K1 and to the input of the first contact K2A of the second switching element K2. An output of the scrambler SCR2 is connected to the input of the second contact K1B of switching element K1 and to the input of the second contact K2B of the switching element K2. The particular outputs of the contacts K1A, K1B, K2A and K2B are connected to further inputs of the microcontroller MCE3. The microcontroller MCE3 is coupled via the transceiver TREE3 to the radio stretch FS3.

The function of the radio system SYS3 is explained in the following. The random number generator PRNG generates pseudo-random numbers PRN that are entered, e.g., from the microcontroller MCA3 into an input message TxT. In the receiving unit EE the arriving random numbers PRN are conducted via two different, preferably hardware-/software scramblers SCR1, SCR2. Bit patterns and/or test sequences are present on the outputs of the scrambler SCR1, SCR2 as binary test patterns or bit sequences BF1, BF2 that are used for the dynamic testing or querying of the two-channel switching elements K1, K2 and of the switching contacts K1B [sic—K1A?], K1B, K2A, K2B. The bit sequences conducted via the switching contacts K1A, K1B, K2A, K2B are fed to the microcontroller MC and transmitted via the transceiver TREE3 to the analysis unit AE3. The input message RxT contains the bit sequences of the individual contacts.

One of the microcontrollers, e.g., MCB3, receives the input message RxT and forwards it to the parallel checking on the microcontroller MCA3. A two-channel analysis takes place, whereby each microcontroller MCA3, MCB3 analyzes switching contacts K1A, K1B, K2A, K2B of the two-channel switching elements K1, K2. A descrambling of the bit sequences BF1, BF2 takes place in the descramblers DESCR1, DESCR2 contained in the particular microcontrollers MCA, MCB, after which a check is made whether the result agrees, with closed switching contacts K1A, K1B, K2A, K2B, with the original random number PRN. If one of the two results does not agree with the test pattern, i.e., the random number PRN, i.e., even with open switching contacts of the switching element, this signal is cut out for safety-related reasons.

In an optional development stage the safety-related cutting off in the case of open switching contacts of a switching device can be coupled to the simultaneous cutting off of other safety-related and non-safety-related signals transmitted via the radio stretch.

The system SYS3 is based on the following considerations:
The system must not turn out to be dangerous, i.e., no open contact may be recognized as closed, and
In order that an open, two-channel switching device is recognized as closed, the following prerequisites must be met at the same time:
In the input message RxT the data of both contacts and/or channels K1A and K1B and K2A and K2B of a switching element K1 and K2 must be so falsified that they both agree according to the descramblers DESCR1, DESCR2 with the original random number PRN,
The probability for this is substantially a function of the length of the random number PRN and the bit sequence BF1/BF2. The probability of the residual error (e.g. $<10^{-7}$) required for the particular application can be achieved by the suitable selection of the length,
With a 24-bit random number or bit sequence that has a Hamming distance of Hd=12, the probability of a dangerous failure per hour is, for example, ca. $1.4 \times 10^{10}$ at an assumed bit error rate on the radio stretch of $10^{-2}$ and with a message cycle of ca. 25 ms.

Even hanging or adhering switching contacts of the two-channel switching device K1, K2 would be reliably detected at the next actuation.

The above method opens the possibility that the bit sequences BF1, BF2, that can also be designated as test bits, are selected in a suitable manner so that they can be directly used as test patterns for the detection of the signals and that the result, i.e., the signals SK1A, SK1B, SK2A, SK2B generated with the aid of the test patterns can be reliably transmitted via the radio stretch FS3 without further reprocessing, i.e., while maintaining the required maximal residual error rate. Furthermore, the selection of the test patterns BF1, BF2 used takes place dynamically by the analysis unit AE3 so that the detection unit EE can be constructed in a very simple manner and that the necessary and reliable and two-channel analysis takes place exclusively in the analysis unit AE.

As already previously explained, the test sequences and bit sequences BF1, BF2 are dynamically given via the random number PRN by the analysis unit AE3.

In order to reduce the data volume to be transmitted, the analysis unit AE3 transmits only one random number PRN or sequence number, whereby the detection unit EE3 generates unambiguous bit sequences BF1, BF2 from it for each connected switching contact K1A, K1B, K2A, K2B, i.e., at least in two channels. The bit sequences BF1, BF2 for detecting the safety-related signals are generated at least in two channels by scrambling, code-spreading or using lookup tables in hardware/or software.

As already previously explained, it is advantageous to use a separate bit sequence BF1, BF2 for the detection of the at least two-channel signals for each channel K1A, K1B and K2A, K2B.

An inventive suggestion provides that the at least two-channel signal determined from the testing represents a single piece of information that is transmitted in one channel to the analysis unit AE.

Figure 5:
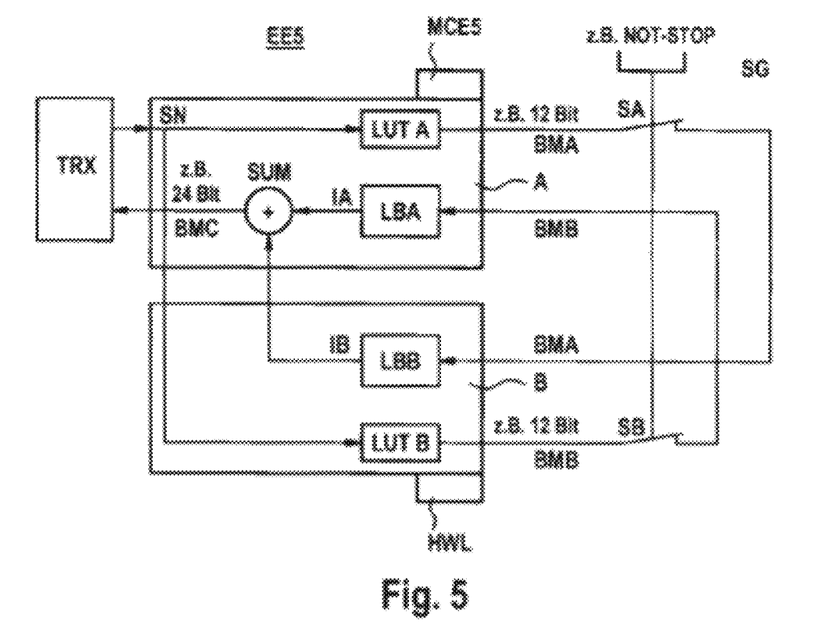
FIG. 5 shows a block schematic of the detection unit (mobile station)

This method will be explained using FIG. 5. FIG. 5 shows the block diagram of a detection unit EE5. In order to detect the states of contacts SA, SB of a two-channel switching device as well as NOT-STOP, the detection unit EE5 is constructed in two channels and comprises a channel A as well as a channel B. The channel A is realized as microcontroller MCE5 on which a logic LBA is implemented as software. The channel B is realized as hardware logic HWL, preferably as a freely programmable logic component such as CPLD or FPGA. Furthermore, a transceiver TRX is provided for coupling the microcontroller MCE5 to the radio stretch FS. Test sequences such as binary test patterns or bit patterns BMA, BMB are generated in the lookup tables LUTA, TUTB using a sequence number SN transmitted from the analysis unit AE1 . . . AE3 via the radio stretch FS which test sequences are conducted via the switching contacts SA, SB. The contact states of the connected switching contacts SA, SB are tested with the binary test patterns BMA, BMB.

The bit patterns BMA, BMB conducted via the switching contacts SA, SB of the two-channel switching element NOT-STOP run through a logic block LBA, LBB of the other channel, whereby the "continuous 0" generated by an open contact SA, SB or by both open contacts SA, SB and unsuited for the transmission is replaced by special bit patterns IA, IB. In conclusion, the two bit patterns are joined together as added to a piece of information or to a bit pattern BMC and transmitted via the transceiver and the radio stretch to the analysis unit.

Figure 6:
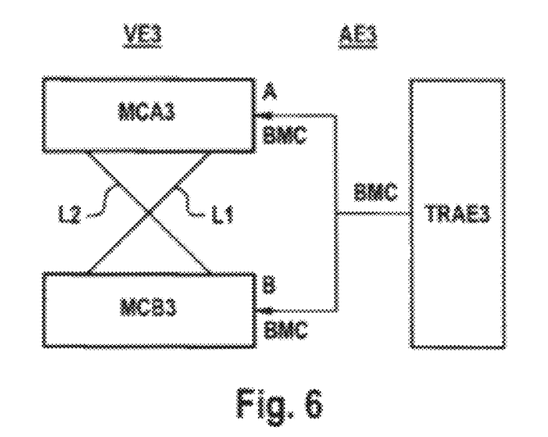
FIG. 6 shows a block schematic of the analysis unit (base station and transceiver, FIG. 7 shows a block schematic of a logic block (mobile station), and FIG. 8 shows a system for the transmission of safety-relevant and application-specific data via safety-certified detection- and processing units.

FIG. 6 shows a block diagram of the analysis unit AE3. It comprises the transceiver TRAE3 as well as the two-channel processing unit VE3 comprising microcontroller MCA3 (channel A) and the microcontroller MCB3 (channel B). A receiving unit of the transceiver forwards the complete information BMC to both microcontrollers MCA3, MCB3. A redundant processing takes place under inclusion of a crosswise comparison of the result. As already previously mentioned, the microcontrollers MCA3, MCB3 of the analysis unit AE3 are coupled crosswise to one another via lines L1, L2 in order to carry out the crosswise comparison of the results.

Figure 7:
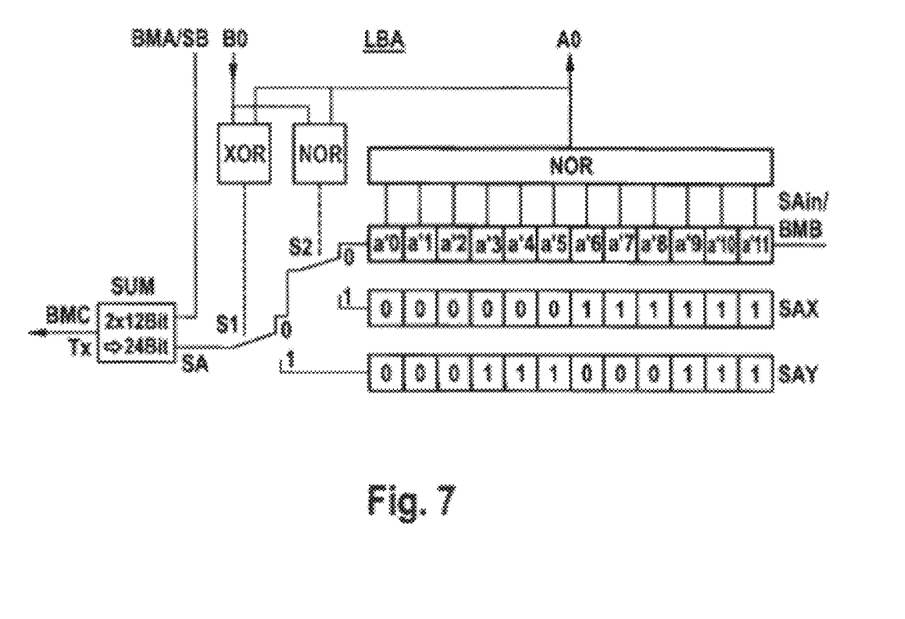

FIG. 7 shows a block diagram of the logic block LBA, LBB according to FIG. 5.

The logic blocks LBA, LBB have the identical construction so that in the following the construction of the logic block LBA is explained. It comprises, among other things, a shift register SRA for reading in the bit pattern BMA; SAin, which was conducted via the switching contact SB. A test block NOR for the recognition of a "continuous 0" (open contact) is connected at a parallel output of the shift register, whose output is connected to a combination logic XOR, NOR for controlling the switching elements S1 and S2. The switching elements S1 and S2 replace a read-in "continuous 0" as a function of the other channel (channel B, signal B0) by special bit patterns (SA X, SAY).

A check is made in the combination logic XOR, NOR whether all bits of both switching contacts SA, SB are equal to "0". If yes, the read-in bit pattern BMA is replaced by the special bit pattern SA X.

To the extent that only one contact SA, SB was recognized as open, this state is communicated to the analysis unit AE by transmitting the information SAY and the information SBY of the logic block LBB), for example, an error state such as "contact hanging" or "transitional phase upon actuation of the switching device".

If both contacts SA, SB are closed, the read-back test patterns BMA, BMB are combined by hanging them together in the summator SUM to a piece of information BMC that corresponds, for example, to the information "NOT-HALT/NOT-STOP not actuated".

The structure of the detection unit EE5 shown in FIG. 5 opens the possibility for the two-channel or multi-channel detection and/or processing of safety-related signals that is distinguished in that the detection and/or processing of a signal with at least two channels, for example, the bit patterns BMA, BMB emanating from the switching contacts SA, SB takes place in software and hardware. It is provided to this end that a channel, for example, channel A is designed as a software channel, realized by the microcomputer MCE5, whereas the channel B is designed as hardware channel HWL as a freely programmable logic component such as CPLD or FPGA.

In order to discover errors in the hardware and/or software in the detection unit EE5 the analysis unit AE transmits in set time intervals additional test sequence numbers SN to which special test patterns are associated in the lookup tables LUTA, LUTB of the detection unit which patterns simulate an open contact (channel A or B) or two open contacts (channel A and B). In this manner errors in the logic blocks LBA, LBB can be discovered by the expectancy behaviour of the analysis unit.

Figure 8:
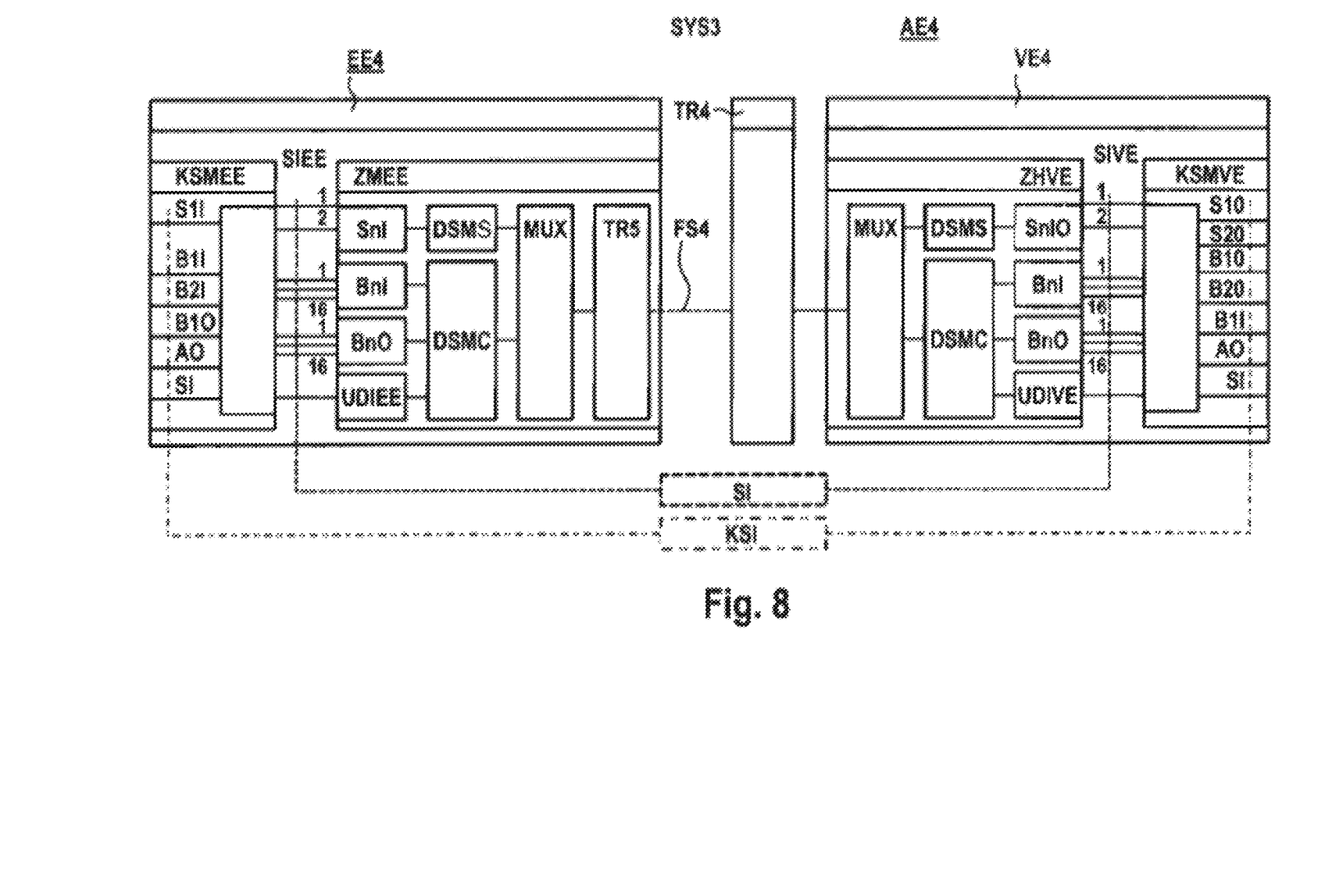

The invention furthermore relates to a system SYS3 shown in FIG. 8 for the transmission of safety-related data between a detection unit EE4 and an analysis unit AE4 via a radio stretch FS4. The analysis unit AE4 comprises a processing unit VE4 and a locally removed transceiver TRA4.

The detection unit EE4 constructed as a mobile station comprises a certified module of a detection unit ZMEE with a standard interface SIEE, with safety-related inputs SnI, operating inputs BnI, operating outputs BnO and with a universal data interface UDIEE. The safety-related inputs SnI are connected via a data security module DSMS for safety-related data to a multiplex/demultiplexer MUX. The operating inputs BnI as well as the interface for the operating outputs BnO and the universal data interface UDIEE are connected to a data security module DSMC for control data. On the output side the data security module for control data is connected to a second input of the multiplexer/demultiplexer MUX. An output of a multiplex or/demultiplexer MUX is connected to a transmitting/receiving unit TRES via which the signals can be transmitted via the radio stretch FS4 to the transceiver TRA4 or can be received.

The processing unit VE4 also comprises a certified module of a processing unit ZMVE that comprises a standard interface is SIVE on the output side. The latter comprises safety-related inputs/outputs SnIO, operating inputs BnI, operating outputs BnO and a universal data interface UDIVE. The interface SnIO is connected via a data security module DSMC for safety-related data to a multiplexer/demultiplexer MUX. The interfaces BnI, BnO and UDIVE are connected via a data security module DSMC for control data to a second input of the multiplex or/demultiplexer MUX whose output is connected to the transceiver TR4 for the transmission and/or reception of data.

The certified modules ZMEE and ZMVE are distinguished over the prior art in that they comprise, in addition to the customary safety-related inputs SnI, safety-related outputs SnO and operating inputs and outputs BnI, BnO, the universal data interfaces UDIEE and UDIVE.

According to the prior art it was not possible to process client-specific data like digital or analog input-/output data or serial data by a certified module.

The invention provided that the certified module ZMEE and ZMVE make the universal data interface UDIEE and UDIVE available for the transmission of non-safety-relevant, client-specific data.

It is furthermore provided that the standard interface SIEE, SIVE is connected to a client-specific module KSMEE, KSMVE that makes a client-specific interface KSIEE, KSIVE available on the output side. In addition to the safety-related inputs and outputs S1I, SiO or operating input and outputs B1I, B2I, B10, B20, according to the invention even analog outputs AO such as analog voltage output or serial interfaces SI such as, for example, RS232 are available that are then processed via the universal data interface UDIEE, UDIVE of the certified unit ZMEE/ZM.

The standard interface SIVE of the certified detection unit ZVE is connected on the output side to the client-specific module KSMVE, and its output makes the client-specific interface KSI available. The latter makes in particular safety-related outputs S1O, S2O and operating inputs and outputs B1O, B2O and B1I available. Even analog outputs AO as well as an analog voltage output and a serial interface SI such as, for example, RS232 can be made available.

The system SYS3 therefore makes possible the flexible transmission of even application-specific data via safety-certified modules. A fixed or also a variable bandwidth (tunnel) for the transparent transmission of non-safety-relevant data is made available by the client-specific module KSMEE, KDMVE in combination with the universal data interface UDIEE, UDIVE integrated into the certified modules ZMEE, ZMVE.

The universal data interface UDIEE, UDIVE can be adapted to a particular application in hardware as well as in software. However, the changes have no influence on the safety-certified part of the system.

According to a preferred embodiment the data of the universal interface UDI is inserted by superposed multiplexing of the multiplexer/demultiplexer MUX in hardware or taken away by packing out of a transmission protocol in software.

According to the invention certified detection units and certified processing units ZMEE, ZMVE are made available that comprise in a standard manner the universal data interface UDIEE, UDIVE, that can be adapted by hardware- and/or software components such as, for example, the client-specific module KSMEE, KDMVE to very different client-specific applications.

It is assumed in the certification of the modules ZMEE, ZMVE with safety-related functions that every possible error state can occur on the universal data interface UDI, so that an influencing of the safety-related functions by the activation, of further client-specific switching parts KSMEE, KDMVE for the adaptation and use of the universal data interface UDI can be excluded.

Thus, no recertification is required in the case of client-specific broadenings, changes to the universal interface UDI.

Measures for Managing Errors:

Basically, the security function is realized in the base station. Additional measures for recognizing and transmitting special states are implemented in the mobile station. These measures (logic blocks and/or software routines) are present in two channels and are cyclically tested by the analysis unit (base station).

Bit Errors on the Radio Stretch:

The base station cuts out in a safety-related manner if the received code word does not correspond to the spread code/scramble code of the given sequence. All codes used have a minimal Hamming distance of Hd=12 among themselves. Therefore, according to GS-ET-26 the following result:

Residual error probability(Gauss)$R(p)$=2.42E-18

Dangerous failure rate per hour $AU$=1.3936E-10.

The requirements on the residual error probability for performance level e according to DIN EN ISO 13849-1 are therefore met.

Error that a Contact does not Open:

The open contact "replaces" the 12 bit test pattern by zeroing. The $2^{nd}$ test pattern is read back via the closed contact. During the composing of the two read-in codeword components an invalid codeword, i.e., a codeword with Hd<12 would be generated. Therefore, the "invalid" codeword: is replaced in the detection unit (mobile station) by a special codeword ("1 contact open/1 contact closed") with Hd=12. The BS cuts out in a safety-related manner upon receiving of this codeword.

Error in the Logic Blocks of the Detection Unit:

The base station transmits test sequence numbers in fixed time intervals that initiate the simulation of one or two open contacts. The simulation takes place in that a "continuous 0" is selected as test pattern of one or both channels. Therefore, errors can be reliably discovered in the logic blocks of the mobile station by the expectation behavior of the base station.

Short-Circuit Between Inputs and Outputs of the Pins to the Contacts:

Since the outputting of the test patterns and the reading in of the bit patterns conducted via the contacts take place via separate components (CPLD and μC), unrecognized short-circuits can be excluded between the input and output of a component in the error analysis.

The invention claimed is:

1. A method for the detection, transmission and analysis of at least one safety-related signal (S1 . . . Sn), whereby the at least one safety-related signal (S1 . . . Sn) is detected with at least one detection unit (EE1 . . . EEn) and transmitted via a radio system (FS) to at least one analysis unit (AE2), wherein the safety-related signal (S1 . . . Sn) emitted by the at least one detection unit (EE1 . . . EEn) is received by transceiver units (TRA1 . . . TRAn) arranged in a spatially distributed manner, whereby the transceiver units are connected via a bus system (BUS) to a processing unit (VE2) of the analysis unit (AE2), wherein the processing unit (VE2) cyclically transmits a message in the form of a frame (TOKEN) into the ring bus (BUS), and wherein the frame (TOKEN) is processed by each transceiver unit (TRA1 . . . TRAn) which has received a valid radio message, whereby a first transceiver unit (TRA) enters the received data into the frame (TOKEN) and replaces an RSSI value and a reception identification character (RxID) if a reception quality of the transceiver unit (TRA1 . . . TRAn) is greater than a reception quality indicated via a frame cyclically received by the receiver unit.

2. The method according to claim 1, wherein the transceiver units (TRA1 . . . TRAn) arranged in a spatially distributed manner prepare the received radio signals and transmit them in digital form via the bus system (BUS) to the processing unit (VE2) (base station).

3. The method according to claim 1, wherein a transmitting/receiving quality for each of the transceiver units (TRA1 . . . TRAn) is determined, and wherein only the transceiver unit (TRA1 . . . TRAn) with the highest transmitting/receiving quality is used for the radio transmission to the processing unit (VE2).

4. The method according to claim 1, wherein the frame (TOKEN) successively passes all transceiver units (TRA1 . . . TRAn) with a defined transit time.

5. The method according to claim 1, wherein each transceiver unit (TRA1 . . . TRAn) increments a counter in the header of the frame (TOKEN).

6. The method according to claim 1, wherein a transmitting of a message takes place by a transceiver unit (TRA1 . . . TRAn), wherein the processing unit (VE2) enters the reception identification character (RxID) of the transceiver unit with the highest reception quality of the last frame (TOKEN), in a transmitter identification field (TxID) of the frame (TOKEN), and wherein the transceiver unit, whose identification character (ID) is entered in the transmitter identification field (TxID), transmits the input message (TXT).

7. The method according to claim 1, wherein the processing unit transmits the message every 25 ms.

* * * * *